United States Patent [19]

Lee

[11] Patent Number: 5,739,521
[45] Date of Patent: Apr. 14, 1998

[54] LASER DIODE CONTROLLING METHOD AND APPARATUS FOR COMPACT DISK DRIVE

[75] Inventor: Heung-weon Lee, Kwacheon, Rep. of Korea

[73] Assignee: Samsung Electronics Co., Ltd., Kyungki-do, Rep. of Korea

[21] Appl. No.: 769,054

[22] Filed: Dec. 18, 1996

[30] Foreign Application Priority Data

Mar. 13, 1996 [KR] Rep. of Korea ............... 96-6648

[51] Int. Cl.$^6$ ............................................. G01J 1/32
[52] U.S. Cl. ............................... 250/205; 250/214 C
[58] Field of Search ............................. 250/205, 206, 250/21 HR, 21 HC; 369/59, 60, 44.14, 44.29, 44.32, 44.35; 372/9, 28, 32

[56] References Cited

U.S. PATENT DOCUMENTS 4,866,691  9/1989  Yokogawa ........................ 369/50

Primary Examiner—Que Le
Attorney, Agent, or Firm—Sughrue, Mion, Zinn, Macpeak & Seas, PLLC

[57] ABSTRACT

A laser diode controlling method for a compact disk drive in which light is radiated from a laser diode to a compact disk and a radio frequency (RF) signal is generated by the light reflected from the compact disk, the method includes the steps of converting the light output from the laser diode into a first electrical signal, detecting the level of the RF signal, generating a second electrical signal by adjusting the level of the first electrical signal on the basis of the level of the RF signal, and generating a driving current for the laser diode on the basis of the second electrical signal. Therefore, various types of compact disks can be driven based on the reflectivity thereof with respect to a laser beam.

5 Claims, 1 Drawing Sheet

LASER DIODE CONTROLLING METHOD AND APPARATUS FOR COMPACT DISK DRIVE

BACKGROUND OF THE INVENTION

The present invention relates to a laser diode controlling method and corresponding apparatus for a compact disk drive.

The majority of compact disks are compact disk-read only memories (CD-ROMs) which can only read recorded data. However, compact disks such as a compact disk-readable (CDR), a compact disk-erasable (CD-E), and a digital video disk (DVD) have recently been developed. Thus, a compact disk drive is required which is compatible with various compact disks.

A pickup in a compact disk drive generally has a laser diode, an optical system, and a photo detector. A laser beam emitted from the laser diode is irradiated on the recording surface of a compact disk via the optical system. Then, light reflected from the compact disk is detected in the photo detector, and output as an electrical signal. From the output electrical signal are generated a radio frequency (RF) signal, a tracking error signal, and a focus error signal. The RF signal is transmitted to a personal computer (PC) via a digital signal processor, a decoder, and an interface. Since every operation is performed using such signals generated in the pickup, adequate control of the light intensity of the laser diode is essential to the performance of the compact disk drive.

FIG. 1 is a schematic circuit diagram for explaining a conventional laser diode controlling method in a compact disk drive. In FIG. 1, reference numeral 101 denotes a laser diode (LD) driver, reference character LD denotes a laser diode, and reference character PD denotes a monitoring photodiode for monitoring the optical output of the laser diode LD. The laser diode LD radiates light upon the application of a driving current I from the laser diode driver 101, and the light intensity of the laser diode LD is detected by the monitoring photodiode PD which generates a feedback current $I_f$. The laser diode driver 101 receives the feedback current $I_f$ and outputs a driving current I which is inversely proportional to the magnitude of the feedback current $I_f$. As a result, a constant light intensity of the laser diode LD can be maintained.

However, in the conventional laser diode controlling method, the light intensity of the laser diode is merely adjusted to a predetermined value without considering the reflectivity of the compact disk. For example, the level of an RF signal varies with the differential reflectivities of the CD-ROM, the CD-R, the CD-E, and DVD. Consequently, various types of compact disks cannot be driven by the conventional laser diode controlling method.

SUMMARY OF THE INVENTION

To overcome the above problem, an object of the present invention is to provide a laser diode controlling method which takes into account the reflectivity of a compact disk.

To achieve the above object, there is provided a laser diode controlling method and corresponding apparatus for a compact disk drive in which light is radiated from a laser diode to a compact disk, and a radio frequency (RF) signal is generated by the light reflected from the compact disk, the method comprising the steps of: (a) converting the light output from the laser diode into a first electrical signal; (b) detecting the level of the RF signal; (c) generating a second electrical signal by adjusting the level of the first electrical signal on the basis of the level of the RF signal; and (d) generating a driving current for the laser diode on the basis of the second electrical signal.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
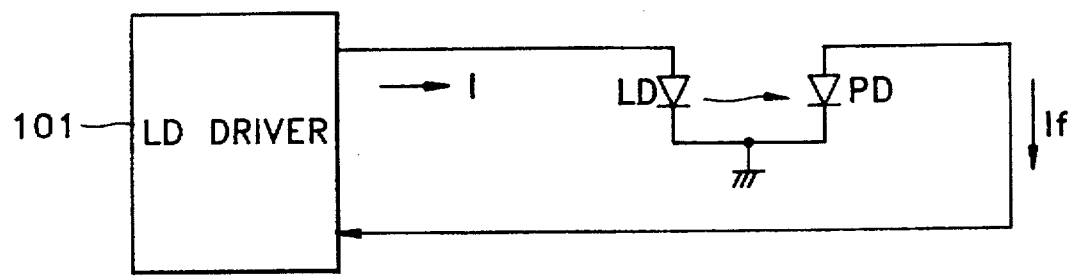
FIG. 1 is a schematic circuit diagram for explaining a conventional laser diode controlling method.
Figure 2:
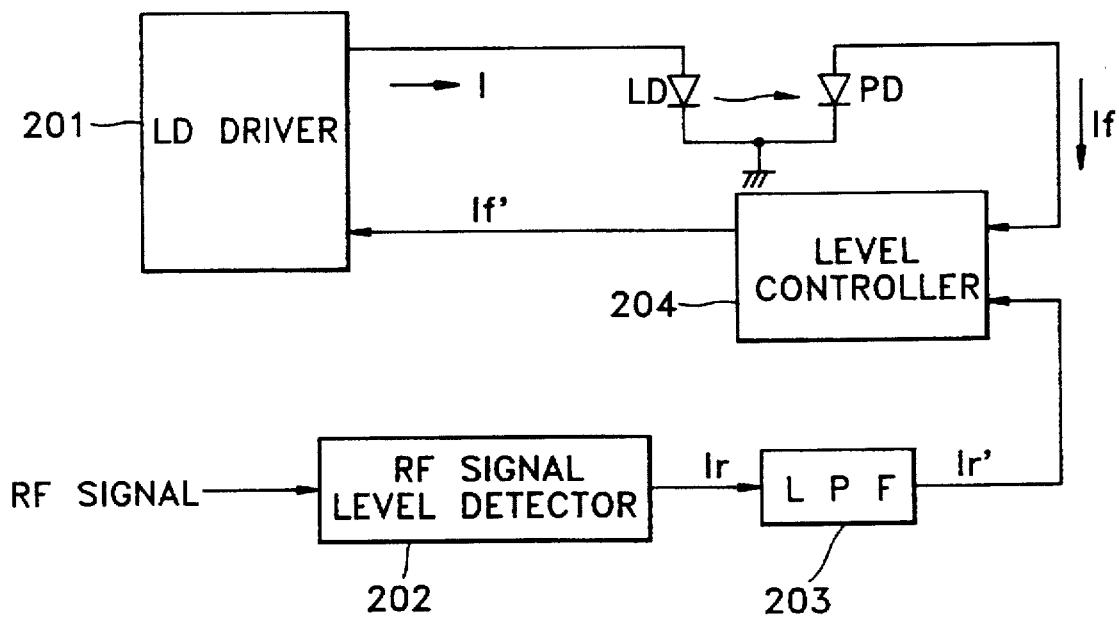
FIG. 2 is a schematic circuit diagram for explaining of a laser diode controlling method according to the present invention.

Referring to FIG. 2, a circuit for implementing the laser diode controlling method according to the present invention includes a laser diode (LD) driver 201, a laser diode (LD), a monitoring photodiode for converting the optical output of the laser diode LD into a first electrical signal (PD), an RF signal level detector 202, a low pass filter (LPF) 203 for removing high frequency components from an output current $I_r$ of the RF signal level detector 202, and a level controller 204 for generating a second electrical signal $I_f'$, obtained by adjusting the magnitude of the first electrical signal $I_f$, on the basis of an output current $I_r'$ of the LPF 203, and for outputting the second electrical signal to the LD driver 201.

The laser diode controlling method according to the present invention will now be described with reference to FIG. 2.

In FIG. 2, the laser diode LD radiates light when a driving current I from the LD driver 201 is applied thereto. Then, the monitoring photodiode PD detects the light intensity of the laser diode LD and generates a feedback current $I_f$. Meanwhile, the RF signal level detector 202 detects the level of an RF signal of an associated compact disk drive and outputs the current $I_r$, corresponding to the detected signal level. The LPF 203 outputs the current $I_r'$, free of the high frequency components of the level detecting current $I_r$. The level controller 204 outputs a current $I_f'$ obtained by adjusting the magnitude of the feedback current $I_f$ on the basis of the output current $I_r'$ of the LPF 203.

The magnitude of the output current $I_f'$ of the level controller 204 is proportional to that of the feedback current $I_f$ and the output current $I_r'$ of the LPF 203. For example, if $I_f'=A \cdot I_f$, where A is an amplification degree, the level controller 204 is designed so that the amplification degree A is proportional to the magnitude of the output current $I_r'$ of the LPF 203. The LD driver 201 outputs the driving current I, inversely proportional to the magnitude of the feedback current $I_f'$, received from the level controller 204. As a result, the LD driver 201 can generate the driving current I considering the reflectivity of a compact disk since it outputs the driving current I inversely proportional to the magnitudes of the feedback current $I_f$ and the output current $I_r'$ of the LPF 203.

As described above, according to the laser diode controlling method of the present invention, various types of compact disks can be driven based on the reflectivity of a particular compact disk with respect to a laser beam.

The present invention is not limited to the above embodiment, and it is clearly understood that many variations are possible within the scope and spirit of the present invention by anyone skilled in the art.

What is claimed is:

1. A laser diode controlling method for a compact disk drive in which light is radiated from a laser diode to a compact disk, and a radio frequency (RF) signal is generated by light reflected from the compact disk, said method comprising the steps of:

(a) converting said light output from said laser diode into a first electrical signal;

(b) detecting the level of said RF signal;

(c) generating a second electrical signal by adjusting the level of said first electrical signal on the basis of the level of said RF signal; and (d) generating a driving current for said laser diode on the basis of said second electrical signal.

2. The method as claimed in claim 1, wherein said step (b) comprises the step of removing high frequency components from said RF signal.

3. The method as claimed in claim 1, wherein the level of said second electrical signal is proportional to the respective levels of said RF signal and said first electrical signal.

4. The method as claimed in claim 1, wherein the magnitude of said driving current is inversely proportional to the magnitude of said second electrical signal.

5. A laser diode control apparatus for a compact disk drive, comprising:

a laser diode for irradiating light onto a compact disk;

a photo diode for converting said light output from said laser diode into a first electrical signal;

a RF signal level detector for detecting the level of an RF signal of said compact disk and for outputting a detection signal; and a controller for adjusting said first electrical signal in accordance with said detection signal and for outputting a second electrical signal.

* * * * *